July 10, 1934.   D. J. GALBRAITH   1,966,341

PIPE INSULATION

Filed June 3, 1933

INVENTOR
DENNIS J. GALBRAITH
By Dorsey & Cole
Attorneys

Patented July 10, 1934

1,966,341

UNITED STATES PATENT OFFICE 1,966,341

PIPE INSULATION

Dennis J. Galbraith, Plainfield, N. J.

Application June 3, 1933, Serial No. 674,256

8 Claims. (Cl. 154—44)

This invention relates to the insulation of pipes and piping systems, being especially applicable to systems in which there is a periodic and rapid exchange of heat between the pipes and their surrounding medium. To illustrate the invention a metal pipe adapted to convey hot water and steam is shown, and in connection with such a pipe is shown also the customary insulation in the form of standard sleeves or jackets of some suitable material, generally asbestos or the like. It is to be understood, however, that the invention is suitable for other types of piping systems and that the appended claims are not to be confined to the specific form shown.

In my copending application, Ser. No. 603,431, I show and describe a method for insulating pipe fittings and connections of various kinds. As is well known in the art, there is a sharp difference in coefficient of expansion between the insulating material and the metal of the pipe, tending in a long straight section to tear the insulation transversely as the metal becomes longer than the insulating sleeves. This process leaves gaps which are not only unsightly but to a considerable degree destroy the effect and purpose of the insulation by allowing the escape of heat through such gaps. Movement between the pipe and insulation, resulting in a separation such as has been described, may be caused also by shrinkage of the insulation as it dries and by expansion as it absorbs moisture from the air; all commercial pipe insulation having a capillary or "wick" action as to atmospheric moisture.

It is the major purpose of this invention to anticipate and provide for the unequal movements of a pipe and its insulation by reason of the causes hereinbefore described, and to thereby prevent the harmful effects hitherto encountered in an insulated piping system.

With this purpose in mind, and others to appear as the description proceeds, reference is made to the accompanying drawing, in which.

Figure 1:
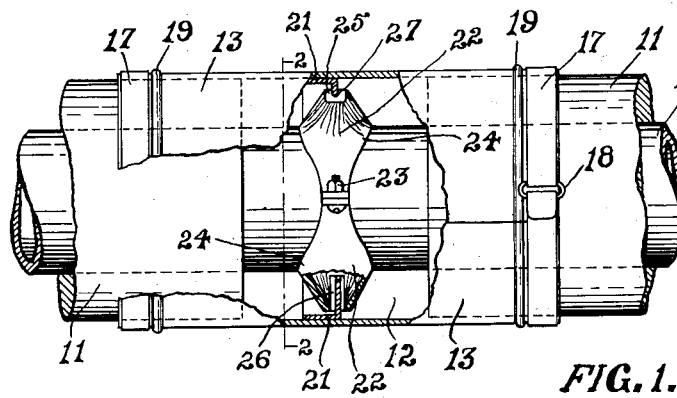
Fig. 1 is a side elevational view, partly in section, of the invention as applied to an insulated pipe.

Referring more particularly to the drawing, 10 is a metal pipe for the transfer of hot water, steam or the like, and 11 is the sleeve of insulation surrounding the pipe. It will be noted that the sleeve 11 is broken, leaving a space 12 between the ends. Such a space 12 occurs at predetermined intervals along the pipe, the distances separating them being determined by the probable difference in expansion of the pipe and the insulating material. Space 12, therefore, may be termed a slippage zone, in which is taken up the longitudinal play of the sleeve 11 as it expands and contracts due to moisture or temperature changes.

Figure 8:
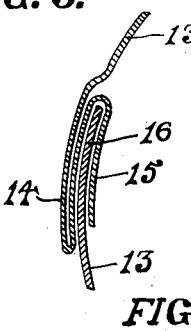
Fig. 8 is a fragmentary sectional view of a modified form of the flexible sleeve forming a part of the invention.
Figures 7, 9:
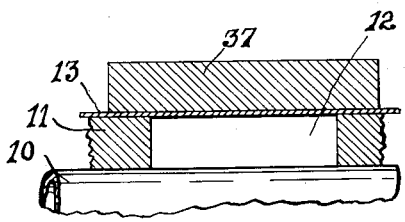
Fig. 7 is a plan view, partly in section, of the apparatus shown in Fig. 6.
Fig. 9 is a fragmentary sectional view of a further modification of the invention.

Surrounding space 12 is a sleeve 13 of flexible material, such as tin, sheet metal or the like, adapted, as shown best in Fig. 1, to extend over and cover a substantial length at each side of space 12 of the sleeves 11. It will be observed that sleeve 13 is circumferentially adjustable, one edge slipping within and fitting closely the other edge. A special modification to allow such action and at the same time to hold the edges of the sleeve in alignment is found in Fig. 8, where one edge is bent into a sharp U curve 14 with a retracting portion 15 forming a sheath for the opposite edge 16 of the sleeve 13. This provision, in addition to holding the edges in alignment, allows for the circumferential adjustment of the sleeve as does the method illustrated in Figs. 1 and 2. To secure the sleeve 13 about the insulation 11, there are provided flexible and adjustable bands 17 at the ends thereof, one end of each of such bands being adapted to pass through a buckle 18 and be bent back upon itself to prevent loosening of the band. Raised ridges 19 near the ends of sleeve 13 prevent lateral shifting of the bands 17; or as shown in Fig. 7, ridges 19 may be supplemented by additional ridges 20 at the extreme edges, thus providing grooved beds for the bands 17. Both ridges 19 and 20 of course further serve as stiffeners for sleeve 13, maintaining the sleeve in its cylindrical form and preventing, through adjustment of bands 17, any gripping of sleeves 11 which might prevent the latter from sliding within the sleeve 13. It will be seen that the flexed strain of sleeve 13 is away from sleeves 11 and against the bands 17.

Figure 2:
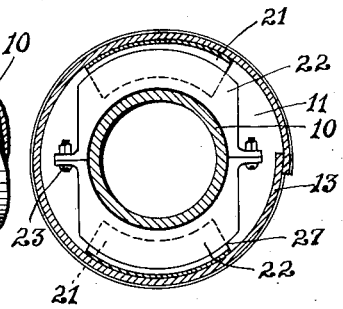
Fig. 2 is a sectional view taken on line 2—2 of Fig. 1.
Figure 3:
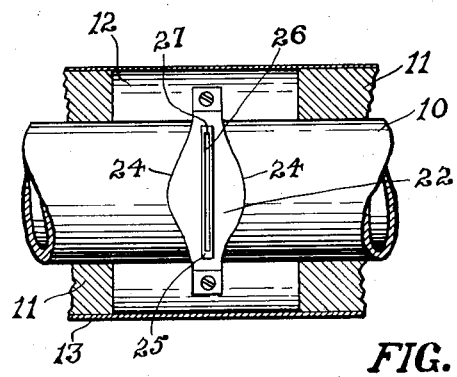
Fig. 3 is a plan view, partly in section, of the apparatus shown in Fig. 1.

Due to expansion and contraction, the insulating cylinders, being freely bound by the ends of the sleeve 13, slip within the sleeve and so shorten and lengthen the free space 12, but this continual action between the sleeve, the insulation and the pipe will tend to cause the sleeve to work itself longitudinally in relation to the space 12 and in time to slip over the end of one or the other of the insulating cylinders 11. The invention provides for this and prevents it by means of a securing apparatus which connects the sleeve 13 and the pipe 10. Such apparatus is comprised of angle members 21 rigidly connected to the inner surface of sleeve 13, and co-operating with such members are the holdfasts 22, secured as by bolts 23 to the pipe 10. As shown in Figs. 1–3, the holdfast 22 is characterized by shoulders 24 which fit about the pipe and give a braced formation in either direction, thus preventing the holdfast from creeping on the pipe, such shoulders sloping to a curved surface 25 in which is a slot 26, having closed ends 27, best shown in Fig. 3. The radially extending flanges of angle members 21 are adapted to extend within the slots 26 which hold them and the sleeve 13 against longitudinal movement, while the closed ends 27 of the slots hold the members 21 and thus the sleeve 13 against circumferential movement. Shoulders 24 of the holdfasts 22 contribute to this rigidity by preventing any creeping motion along the pipe, and serve to brace against strains in either direction caused by the expansion of the elements.

Figure 4:
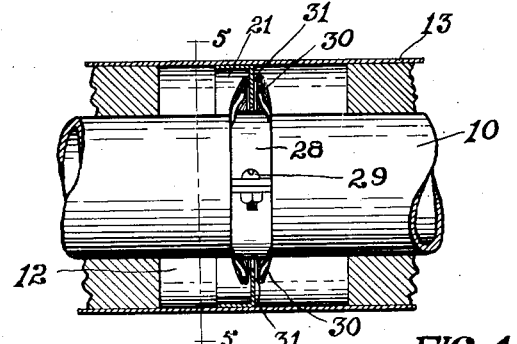
Fig. 4 is a side elevational view, partly in section, similar to Fig. 1, showing a modified form of the invention.
Figure 5:
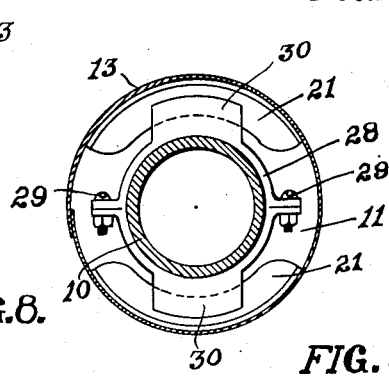
Fig. 5 is a sectional view taken on line 5—5 of Fig. 4.

Figs. 4 and 5 illustrate a modification in which the pipe, insulation and outer sleeve are the same, but the holdfasts are of simpler construction and do not provide against circumferential movement. In this form metal bands 28 are secured to the pipe 10 as by bolts 29. From either side of bands 28 flaps or integral extensions 30 extend outwardly and are bent toward one another to form slots 31 within which the radially extending flanges of angle members 21 are held. It will be seen that, as regards longitudinal movement, this form provides the same prevention as the modification of Figs. 1–3.

Figure 6:
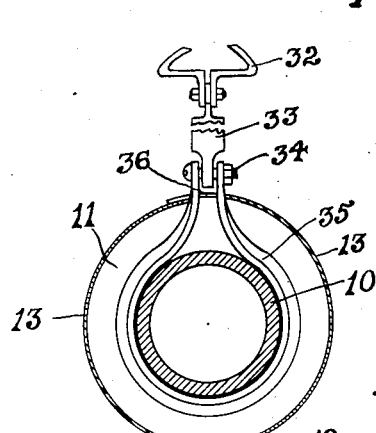
Fig. 6 is an end sectional view showing a further modification of the invention as used with a hanger for the pipe.

A third modification is shown in Figs. 6 and 7, where it is desired to use the invention in connection with a pipe hanger, the hanger itself not being regarded as a part of the invention except in combination with the other features to be described. Such a hanger customarily is attached to a floor beam by means of clamp 32, or by any other suitable means, and comprises an arm 33 having detachable means 34 to hold a supporting band 35 which surrounds the pipe 10. In this form no other type of holdfast is used, but the sleeve 13 is slotted at both edges so that when the edges of the sleeve are brought together over the insulation 11, an opening 36 is left to allow the passage of the ends of band 35. While the modification of Figs. 6 and 7 does not furnish the same degree of rigidity as the other two already described, it will be seen that there is present the space 12 in which the expansion of the pipe and insulation is compensated, the flexible and adjustable sleeve 13 covering space 12, and a definite connection between the sleeve and the pipe to preserve their relative positions in regard to the insulation.

In all of the modifications shown, there will be some loss of heat through the spaces 12 and sleeves 13. Fig. 9 shows a modification of the invention adapted to prevent this, in cases where the loss would be of importance. Here the sleeve 13 is covered with a second sleeve of insulation 37, extending a short distance beyond the edges of space 12. It is understood that this provision may be used with any of the modifications shown and described, the only change being required is that of Figs. 6 and 7 where the sleeve 37 would be slotted in the same manner as sleeve 13, to provide an opening for the ends of band 35.

It is realized that further modifications and variations might be substituted for those shown purely for purposes of illustration, without departing from the spirit of the invention, and it is not intended that the appended claims shall be so narrowly construed as to exclude such modifications.

I claim:

1. Apparatus for insulating a pipe which comprises cylindrical sleeves of insulation surrounding the pipe, such sleeves being separated to provide a slippage zone, a flexible sleeve surrounding the slippage zone, and means located in the zone and connecting the pipe and the said flexible sleeve whereby movement of the sleeve relative to the pipe is prevented.

2. Apparatus for insulating a pipe which comprises cylindrical sleeves of insulation surrounding the pipe, such sleeves being separated to provide a slippage zone, a flexible sleeve surrounding the slippage zone, a sleeve of insulation surrounding the said flexible sleeve, and means located in the zone and connecting the pipe and the flexible sleeve whereby movement of the sleeve relative to the pipe is prevented.

3. Apparatus for insulating a pipe which comprises cylindrical sleeves of insulation surrounding the pipe, such sleeves being spaced apart longitudinally to provide a slippage zone, a flexible sleeve surrounding the slippage zone and overlapping the ends of the sleeves of insulation, and means located in the slippage zone and connecting the pipe and the said flexible sleeve whereby movement of the sleeve relative to the pipe is prevented.

4. In a system of pipe insulation which comprises cylindrical sleeves of insulation surrounding the pipe, such sleeves being spaced apart longitudinally to provide a slippage zone, the combination of a split flexible sleeve adapted to overlap the ends of the said sleeves of insulation and to enclose the said slippage zone, such sleeve being adjustable circumferentially, and means located within the slippage zone and removably secured to the pipe, such means being adapted to connect the pipe and the flexible sleeve and prevent movement of the flexible sleeve relative to the pipe.

5. In a system of pipe insulation which comprises cylindrical sleeves of insulation surrounding the pipe, such sleeves being spaced apart to provide a slippage zone, a split flexible sleeve adapted to overlap the ends of the said sleeves of insulation and to enclose the said slippage zone, such sleeve being adjustable circumferentially, a sleeve of insulation surrounding the said flexible sleeve and extending longitudinally at least as far as the said slippage zone, and means located within the slippage zone and connecting the pipe and the flexible sleeve whereby movement of the sleeve relative to the pipe is prevented.

6. Apparatus for insulating a pipe which comprises cylindrical sleeves of insulation surrounding the pipe, the sleeves being separated to provide a slippage zone, a flexible sleeve adapted to enclose the slippage zone, a removable collar adapted to be rigidly secured to the pipe within the slippage zone, and means connecting the collar and the said flexible sleeve whereby movement of the flexible sleeve relative to the pipe is prevented.

7. Apparatus for insulating a pipe which comprises cylindrical sleeves of insulation surrounding the pipe, the sleeves being separated to provide a slippage zone, a flexible sleeve adapted to enclose the slippage zone, a circumferential angle iron rigidly secured to the inner surface of the flexible sleeve and having a flange extending radially toward the pipe, and a removable collar adapted to be rigidly secured to the pipe within the slippage zone, such collar being provided with a slot extending circumferentially of the pipe, the slot being adapted to receive and hold the said flange.

8. Apparatus for insulating a pipe which comprises cylindrical sleeves of insulation surrounding the pipe, the sleeves being separated to provide a slippage zone, and a split flexible sleeve adjustable circumferentially and adapted to enclose the slippage zone, the sleeve being provided with an opening, in combination with a hanger for the pipe, the hanger comprising a collar adapted to surround the pipe within the slippage zone, an arm connected to the collar and adapted to extend through the said opening of the flexible sleeve, and attaching means secured to the said arm.

DENNIS J. GALBRAITH.